United States Patent
Saito (10) Patent No.: US 10,740,611 B2
(45) Date of Patent: Aug. 11, 2020

(54) STATE DETERMINATION SYSTEM, STATE DETERMINATION METHOD, AND MOVABLE ROBOT

(71) Applicant: TOYOTA JIDOSHA KABUSHIKI KAISHA, Toyota-shi, Aichi-ken (JP)

(72) Inventor: Fuminori Saito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 14/577,298

(22) Filed: Dec. 19, 2014

(65) Prior Publication Data
US 2015/0186729 A1     Jul. 2, 2015

(30) Foreign Application Priority Data

Dec. 26, 2013 (JP) .................. 2013-269538

(51) Int. Cl.
*G06K 9/00*     (2006.01)

(52) U.S. Cl.
CPC ............... *G06K 9/00671* (2013.01)

(58) Field of Classification Search
None
See application file for complete search history.

(56) References Cited

U.S. PATENT DOCUMENTS

| | | | | |
|---|---|---|---|---|
| 8,111,156 B2 * | 2/2012 | Song | ............... | G08B 13/19647 340/539.22 |
| 8,583,282 B2 * | 11/2013 | Angle | ............... | B25J 5/007 700/245 |
| 8,953,841 B1 * | 2/2015 | Leblang | ............... | G06K 9/00671 345/633 |
| 2004/0113777 A1 * | 6/2004 | Matsuhira | ............... | G08B 13/19645 340/541 |
| 2004/0236466 A1 | 11/2004 | Ota et al. | | |
| 2011/0205359 A1 * | 8/2011 | Lee | ............... | G08B 13/19608 348/143 |
| 2012/0016620 A1 * | 1/2012 | Li | ............... | G01R 31/2808 702/121 |

(Continued)

FOREIGN PATENT DOCUMENTS

| | | |
|---|---|---|
| JP | A-2003-51083 | 2/2003 |
| JP | 2004-185080 A | 7/2004 |

*Primary Examiner* — Vikkram Bali
(74) *Attorney, Agent, or Firm* — Oliff PLC (57) ABSTRACT

An state determination system comprises an information acquiring portion that acquires an environment information, a movable body, an instruction portion that performs an action instruction to the movable body, and an estimation portion that estimates an abnormality of the object based on at least one of the information acquired by the information acquiring portion and the environment information acquired by the movable body. In case the estimation portion estimates the abnormality of the object, the instruction portion performs the action instruction for moving to the neighborhood of the object and requiring a response, to the movable body. At least one of the information acquiring portion and the movable body acquires the response state of the object to the action of the movable body instructed by the instruction portion. The state determination system comprises a determination portion that the abnormality of the object based on the acquired response state.

6 Claims, 3 Drawing Sheets

(56) References Cited

U.S. PATENT DOCUMENTS

| | | | |
|---|---|---|---|
| 2012/0182392 A1* | 7/2012 | Kearns | B25J 11/009 348/46 |
| 2013/0329945 A1* | 12/2013 | Yang | G06K 9/00798 382/103 |
| 2013/0342696 A1* | 12/2013 | Cai | H04N 7/18 348/148 |
| 2014/0085477 A1* | 3/2014 | Takano | B60R 25/305 348/148 |
| 2014/0198214 A1* | 7/2014 | Maruoka | B62D 15/0295 348/148 |

* cited by examiner

STATE DETERMINATION SYSTEM, STATE DETERMINATION METHOD, AND MOVABLE ROBOT

INCORPORATION BY REFERENCE

This application is based upon and claims the benefit of priority from Japanese patent application No. 2013-269538, filed on Dec. 26, 2013, the disclosure of which is incorporated herein in its entirety by reference.

BACKGROUND OF THE INVENTION

1. Field of the Invention

The present invention is related to a state determination system which determines an abnormal state of an object in a predetermined environment, a state determination method and a movable robot 2. Description of Related Art There is well-known a method in which, an abnormal state is detected by a camera and the like in a predetermined environment, a robot moves to the abnormal place and acquires an accurate information of an object (for example, refer to Japanese Unexamined Patent Application No. 2003-051083).

However, in the above mentioned method in case of determining whether the object is abnormal or not, in the environment where information cannot be detected by the camera and the like, it can be difficult to determine the abnormal state accurately. Furthermore, there are areas in which it is impossible to make sure the object adequately because it is difficult to install a camera and the like from a point of view of privacy, The present invention has been made to solve the above-mentioned problem, and therefore has a primary object to provide a state determination system which can accurately determine the abnormal state of the object in the area where it is impossible to make sure the object adequately, a state determination method and a movable robot.

SUMMARY OF THE INVENTION

To achieve the above-mentioned object, according to a first exemplary aspect of the present invention, there is provided an state determination system comprising: information acquiring means that is provided in at least one of a predetermined environment and an object, and acquires an environment information; a movable body that autonomously moves and acquires a circumferential environment information; instruction means that performs an action instruction to the movable body; and estimation means that estimates an abnormality of the object based on at least one of the information acquired by the information acquiring means and the environment information acquired by the movable body, wherein in case the estimation means estimates the abnormality of the object, the instruction means performs the action instruction for moving to the neighborhood of the object and requiring a response, to the movable body, at least one of the information acquiring means and the movable body acquires the response state of the object to the action of the movable body instructed by the instruction means, and the state determination system comprises determination means that the abnormality of the object based on the acquired response state.

In the first exemplary aspect, wherein the movable body may include acquiring means that acquires a circumferential image and/or voice, the movable body may remove an obstacle at the time of the acquiring means acquiring the image and/or voice of the object in response to the action instruction from the instruction means, the acquiring means may acquire the image and/or voice of the response state of the object, and the determination means may determine the abnormality of the object based on the image and/or voice of the response state of the object acquired by the acquiring means.

In the first exemplary aspect, wherein the estimation means may estimate the abnormality of the object based on at least one of the information acquired by the acquiring means and the environment information acquired by the movable body, and an action pattern information of the object.

In the first exemplary aspect, the state determination device may further comprise reporting means that reports in case the determination means determines the object is abnormal. In the first exemplary aspect, in case of determining the position of the object estimated as the abnormality by the estimation means is within a predetermined area which is set in advance, the instruction means may perform the action instruction for moving to the neighborhood of the object and requiring a response, to the movable body.

To achieve the above-mentioned object, according to a second exemplary aspect of the present invention, there is provided a state determination method for a state determination device which comprises: information acquiring means that is provided in at least one of a predetermined environment and an object, and acquires an environment information; a movable body that autonomously moves and acquires a circumferential environment information, the method comprising: estimating an abnormality of the object based on at least one of the information acquired by the information acquiring means and the environment information acquired by the movable body; performing the action instruction for moving to the neighborhood of the object and requiring a response, to the movable body in case of estimating the abnormality of the object; at least one of the information acquiring means and the movable body acquiring the response state of the object to the instructed action of the movable body; and determining that the abnormality of the object based on the acquired response state.

To achieve the above-mentioned object of the present invention, according to a third exemplary aspect of the present invention, there is provided a movable robot comprising: a first sensor that acquires a circumferential environment information; and estimation means that estimates an abnormality of an object based on at least one of an environment information acquired by a second sensor provided in at least one of a predetermined area and the object, and the environment information acquired by the first sensor, wherein in case the estimation means the abnormality of the object, the movable robot performs an action for moving to the neighborhood of the object and requiring a response, at least one of the first sensor and second sensor acquires the response state of the object to the action of the movable robot, and the movable robot comprises determination means that the abnormality of the object based on the response state of the object acquired by at least one of the first sensor and second sensor.

According to exemplary aspects of the present invention, it is possible to provide a state determination system which can accurately determine the abnormal state of the object in the area where it is impossible to make sure the object adequately, a state determination method and a movable robot.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

The above and other aspects, features, and advantages of the present invention will become more apparent from the following description of certain exemplary embodiments when taken in conjunction with the accompanying drawings, in which.

DESCRIPTION OF THE EXEMPLARY EMBODIMENTS

Figure 1:
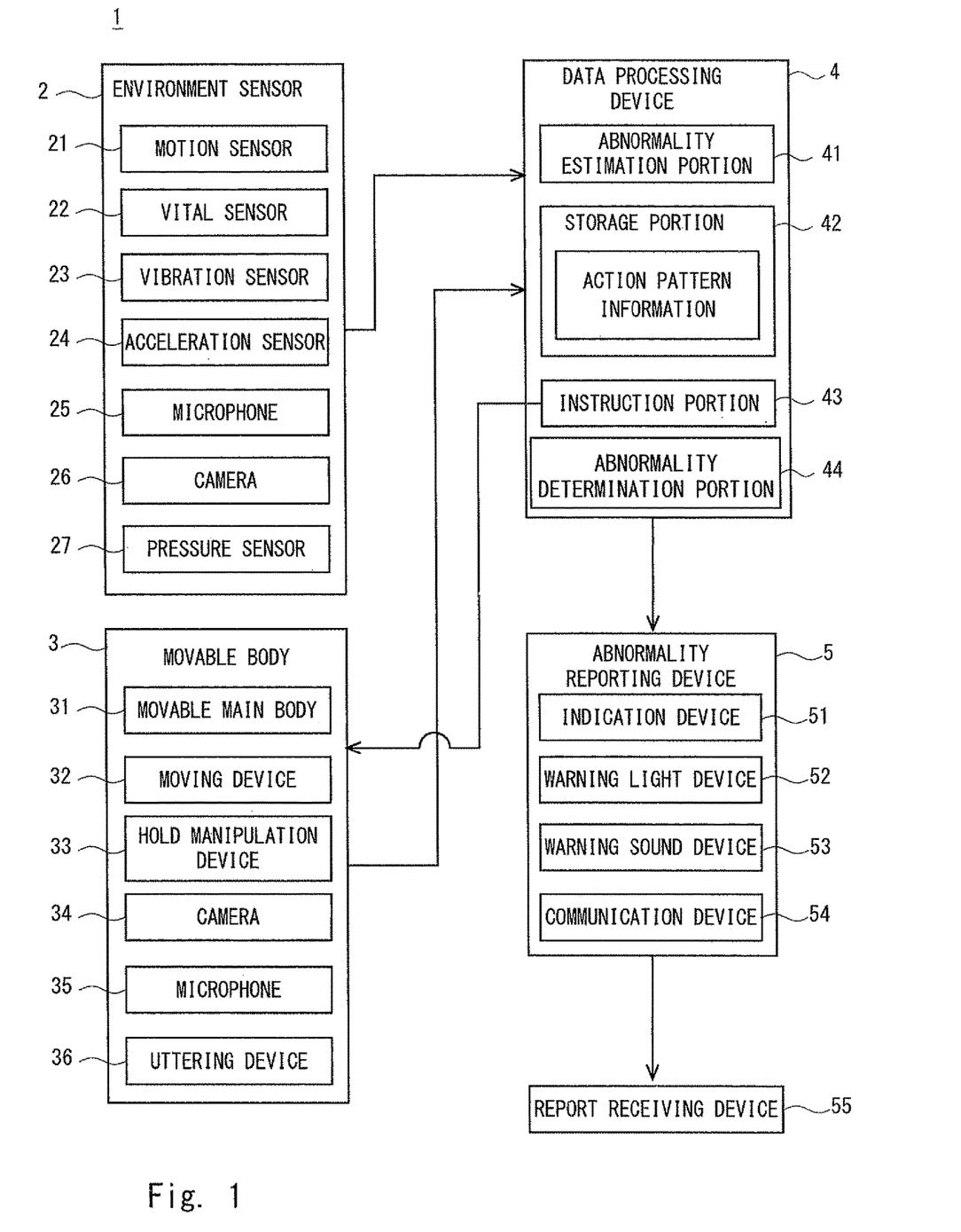
FIG. 1 is a block diagram showing a schematic system configuration of the state determination system according to an exemplary embodiment of the present invention.

Exemplary embodiments for carrying out the present invention will be described below with reference to the accompanying drawings. FIG. 1 is a block diagram showing a schematic system configuration of the state determination system according to an exemplary embodiment of the present invention. A state determination system 1 according to the present embodiment includes an environment sensor 2, a movable body 3, data processing device 4, an abnormality reporting device 5.

The environment sensor 2 is a specific example of an information acquiring means and a second sensor. The environment sensor 2 is installed in a predetermined environment (a house, a nursing home, a hospital, a school, a shopping center, and the like). The environment sensor 2 acquires an environment information (a vital information, a voice information, and an image information of an object to be controlled (hereinafter, "the object")) of the object in the predetermined environment. The environment sensor 2 includes for example a motion sensor 21, a vital sensor (a temperature sensor, a pulse sensor and the like) 22, a vibration sensor 23, an acceleration sensor 24, a microphone 25, a camera 26 which is installed on a ceiling and the like and detects the object. The environment sensor 2 includes a pressure sensor 27 which is installed in a chair, a bed, a sofa and the like. Note that the environment sensor 2 may be installed in a clothing, glasses, a bag, a watch, a potable terminal and the like which the object has or is equipped with. The environment sensor 2 transmits the acquired environment information via a wireless or a wire such as a Bluetooth (a registered trademark) or wireless LAN and the like to the data processing device 4.

The movable body 3 is configured as a movable robot. The movable body 3 autonomously moves and acquires the environment information of the circumference (a voice information, an image information and the like)(refer to FIG. 2). The movable body 3 includes a movable main body 31, a moving device 32 which moves the movable main body 31, a hold manipulation device (an articulated arm and the like) 33 which holds an object, a camera (a specific example of an acquiring means and a first sensor) 34 which takes the circumference, a microphone (a specific example of the first sensor) 35 which acquires a voice of the circumference, and an uttering device 36 which outputs a voice and performs a conversation with the object. Note that the configure of the above-mentioned movable body 3 is an example and is not limited to this. An optional configuration which can move autonomously is applicable. The movable body 3 transmits the acquired environment information via the wireless to the data processing device 4.

The data processing device 4 includes an abnormality estimation portion 41, a storage portion 42, an instruction portion 43, and an abnormality determination portion 44. The data processing device 4 may be implemented by hardware with a microcomputer as a center, for example, and the microcomputer includes a CPU (Central Processing Unit) 4a for performing control processing, arithmetic processing, and the like, a memory 4b includes a ROM (Read Only Memory) or RAM (Random Access Memory) for storing a control program executed by the CPU, a calculation program and the like, and an interface portion (I/F) 4c which inputs and outputs a signal with the outside, and the like. The CPU 4a, the memory 4b, and the interface portion 4c are connected via a data bus 4d each other.

The abnormality estimation portion 41 is a specific example of a estimation means. The abnormality estimation portion 41 estimates that the object in the environment is abnormal (a physical malfunction and the like). The abnormality estimation portion 41 estimates the abnormality of the object in the environment based on the environment information transmitted by at least one of the movable body 3 and the environment sensor 2.

The abnormality estimation 41 estimates the abnormality of the object, for example based on the vital information of the object (a temperature, a pulse, a breathing number, blood pressure, and the like) detected by the vital sensor 22 installed in a bed. The abnormality estimation portion 41 estimates the abnormality of the object, for example based on the voice of the object detected by the microphone 25, 35 installed in the environment or the movable body 3.

The storage portion 42 is configured by the above-mentioned memory 4b and the like. The storage portion 42 stores an action pattern information representing the action pattern of the object. The action pattern information includes for example a place of the object, a stay time at the same place, and an image information of an action. The action pattern information includes a voice information (a sound sort (frequency), a sound continuation time, a sound frequency, a sound pressure level, and the like) in a predetermined place (a bathroom, a toilet, a bedroom, a kitchen and the like).

The action pattern information may include, for example the sound frequency, the sound continuation time, the sound frequency, and the sound pressure level in the every action sort of the object (a shampoo, washing a body, using a shower, and bathing in the bathroom, and the like). The action pattern information is stored in the storage potion 42 in advance, however the configuration is not limited to this. The storage portion 42 may successively store the environment information transmitted by the movable body 3 and the environment sensor 2 as the action pattern information.

The abnormality estimation portion 41 may estimate the abnormality of the object in the environment based on the environment information transmitted by at least one of the movable body 3 and the environment sensor 2 and the action pattern information of the storage portion 42. The abnormality estimation portion 41 compares, for example the voice information of the bathroom transmitted by the environment sensor 2 with the voice information included in the action pattern information of the storage portion 42. The abnormality estimation portion 41 estimates that the object is abnormal in case the difference value between the voice information of the environment sensor 2 and the action pattern information of the storage portion 42 is not less than a predetermined value. The abnormality estimation portion 41 estimates that the object is abnormal in case of determining that the time during which the object stay at the same place is not less than a predetermined time based on the position of the object transmitted by the environment sensor 2 and the action pattern information of the storage portion 42. Thereby, the abnormality estimation portion 41 can estimate the abnormality more accurately by reflecting the action characteristic of the respective object.

The instruction portion 43 is a specific example of instruction means. The instruction portion 43 performs an action instruction to the movable body 3. The instruction portion 43 transmits the action instruction including a target position to which the movable body 3 moves and the operation contents in the target position as a control signal.

Figure 2:
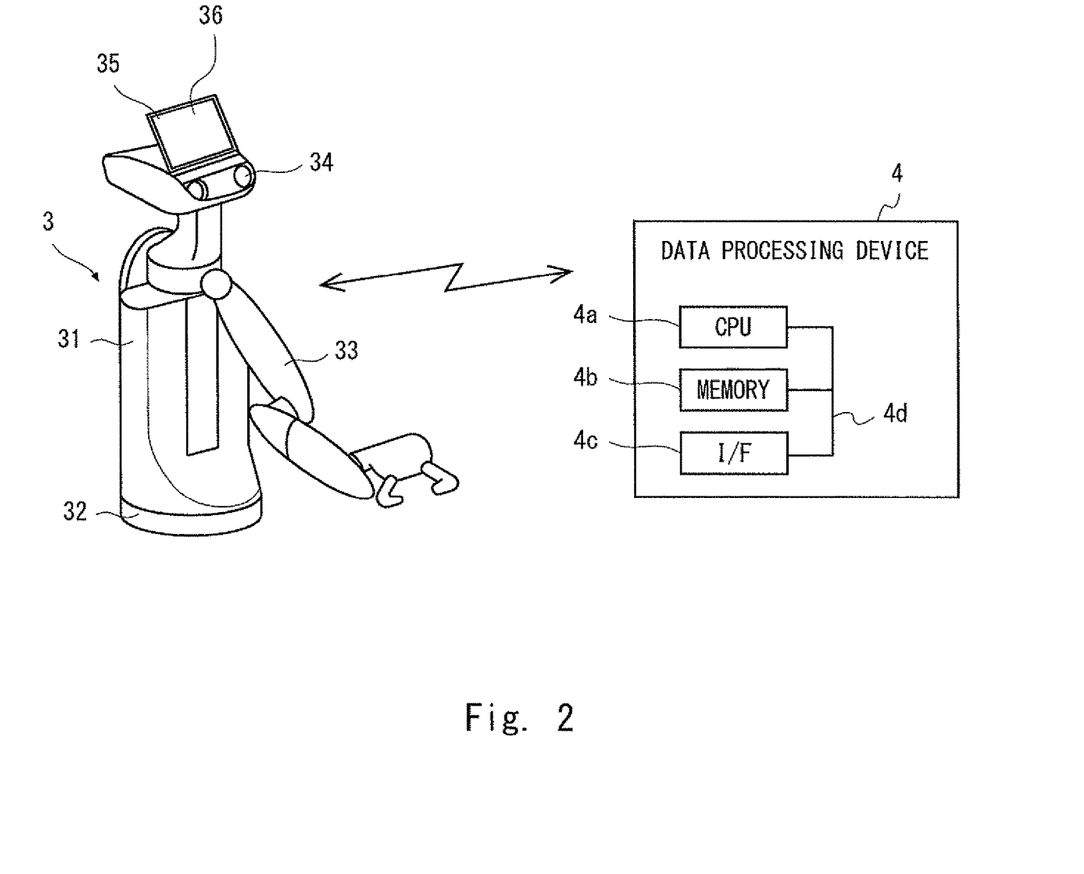
FIG. 2 is a figure showing a configuration example of a movable body according to an exemplary embodiment of the present invention.

For example, the instruction portion 43 specifies the position of the object estimated as the abnormality by the abnormality estimation portion 41 based on the environment information transmitted by the environment sensor 2 or the movable body 3 and a map information in the environment. The instruction portion 43 performs the action instruction for moving the movable body 3 to the specified position. Moreover, the instruction portion 43 performs the action instruction requiring a response of the object to the movable body 3 in order to make sure the safety of the object in the specified position. The movable body 3 outputs a calling voice for making sure the safety of the object by using the uttering device 36 in response to the action instruction from the instruction portion 43. The movable body 3 opens a door, moves an environment object (a futon, a chair, a table, and the like), or contacts (pushes, taps, swings, and the like) the object, in response to the action instruction from the instruction portion 43 by using the hold manipulation device 33.

The abnormality determination portion 44 is a specific example of determination means. The abnormality determination portion 44 finally determines the abnormality of the object estimated by the abnormality estimation portion 41. The abnormality determination portion 44 determines the response state of the object to the action for requiring the response which the movable body 3 performs based on the environment information from the environment sensor 2 and/or the movable body 3, to determine the abnormality of the object. For example, the abnormality determination portion 44 determines whether the response state is normal or not base on the image information of the response state of the object taken by the camera 34 of the movable body 3 and/or the voice information of the response state of the object acquired by the microphone 35, to finally determine the abnormality of the object.

The abnormality determination portion 44 may determine the response state of the object to the action for requiring the response which the movable body 3 performs based on the environment information from the environment sensor 2 and/or the movable body 3 and the action pattern information of the storage portion 42, to determine the abnormality of the object. On finally determining the abnormality of the object, the abnormality determination portion 44 outputs an abnormality signal to the abnormality reporting device 5.

The abnormality reporting device 5 performs a report of the abnormality to an administrator in response to the abnormality signal from the abnormality determination portion 44. The abnormality reporting device 5 performs the report to the administrator by using, for example an indication device 51 indicating an abnormality, a warning light device 52 lighting or blinking a warning light, a warning sound device 53 outputting a warning sound, a communication device 54, and the like. The abnormality reporting device 5 may transmit the abnormality signal to report the abnormality to a report receiving device 55 established in a remote place by using the reporting device 54. The administrator in the remote place can recognize the abnormality of the object via the report receiving device 55.

Recently, while an aging society proceeding, a camera and the like is installed in a predetermined environment, and an abnormality of an object in the predetermined environment is monitored. Meanwhile, it becomes difficult to install the camera and the like from a point of view of privacy. Accordingly, there are areas in which it is impossible to make sure the object adequately. While, in the state determination system 1 according to the present embodiment, in case the abnormality estimation portion 41 of the data processing device 4 estimates the abnormality of the object, the instruction portion 43 performs the action instruction for moving to a neighborhood of the object and requiring the response, to the movable body 3. At least one of the environment sensor 2 and the movable body 3 acquires the environment information of the response state of the object for the action requiring the response of the movable body 3. The abnormality determination portion 44 determines the abnormality of the object based on the environment information of the response state acquired by at least one of the environment sensor 2 and the movable body 3.

Accordingly, the movable body 3 moves to the neighborhood of the object, requires the response, and makes sure the response state, thereby it becomes possible to grasp the accurate state of the object which cannot be obtained only by the sensor information of the environment sensor 2. Therefore, in the area in which it is impossible to make sure the object adequately, the abnormality state of the object can be determined accurately.

Figure 3:
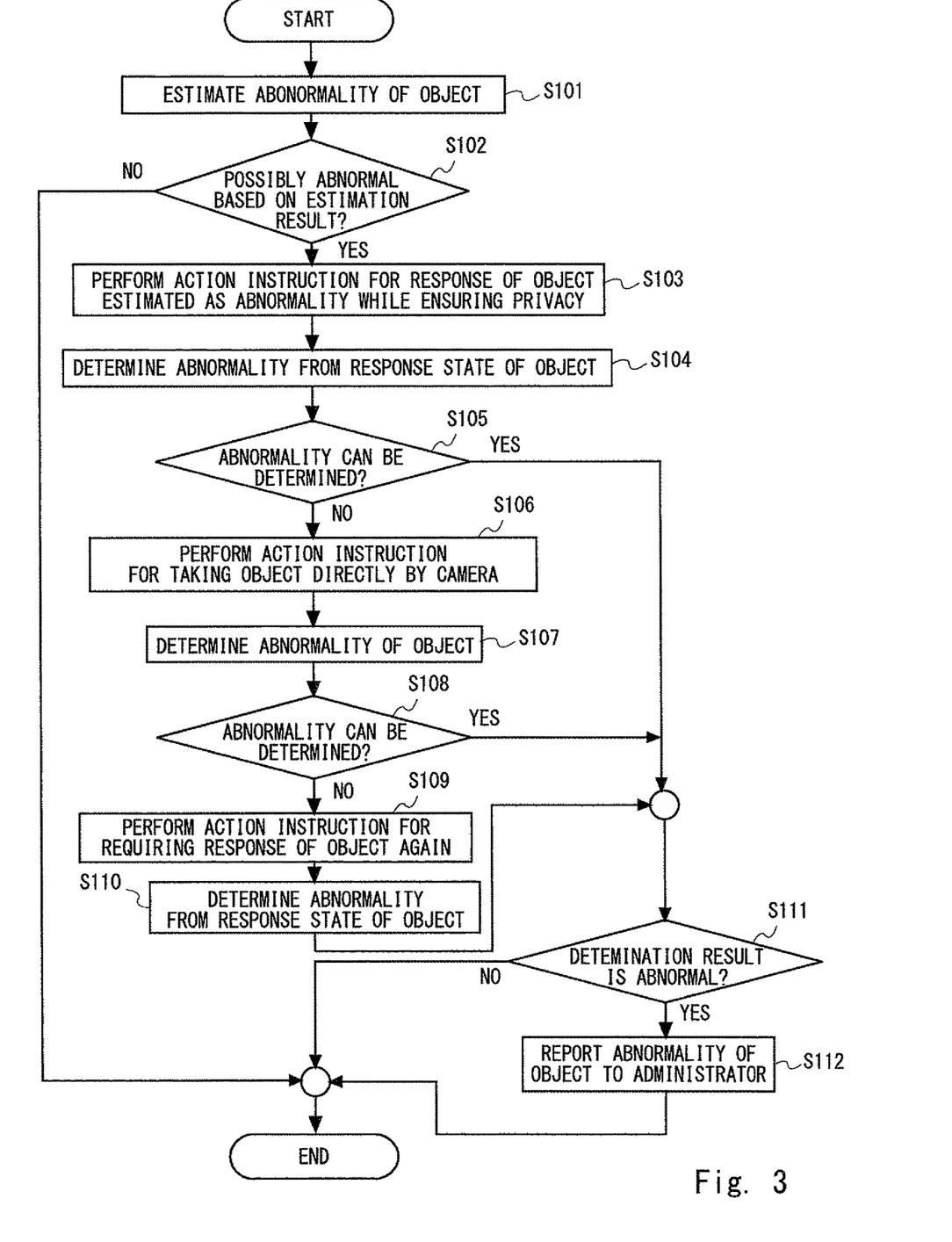
FIG. 3 is a flowchart showing an exemplary processing flow of the state determination system according to an exemplary embodiment of the present invention.

FIG. 3 is a flowchart showing an exemplary processing flow of the state determination system according to an exemplary embodiment of the present invention. The processing flow shown in FIG. 3 is executed repeatedly in every predetermined time.

The abnormality estimation portion 41 of the data processing device 4 estimates the abnormality of the object in the environment based on the environment information transmitted by at least one of the movable body 3 and the environment sensor 2, and the action pattern information of the storage portion 42 (step S101). In case the abnormality estimation portion 41 estimates the object to be possibly abnormal based on the estimation result (Yes of step S102), the instruction portion 43 performs the action instruction for moving to the neighborhood of the object and requiring the response of the object estimated as the abnormality while ensuring the privacy of the object to the movable body 3 (step S103). Then, the instruction portion 43 performs the action instruction in which the abnormality of the object can be made sure without taking the object by the camera 34 of the movable body 3 to the movable body 3 as a first confirmation step.

For example, the instruction portion 43 performs the action instruction for making sure the safety of the object, by using the uttering device 36 or the hold manipulation device 33, to the movable body 3. More specifically, in case there is the object estimated as the abnormality by the abnormality estimation portion 41 in a toilet or a bathroom where it is difficult to install a camera, the instruction portion 43 performs the action instruction for knocking a door of the toilet or the bathroom by using the hold manipulation device 33, to the movable body 3. Or, in that case the instruction portion 43 performs the action instruction for calling the object ("Are you all right?" and the like) in the toilet or the bathroom to the movable body 3. Meanwhile, in case the abnormality estimation portion 41 estimates the object not to be possibly abnormal (No of step S102), this process is ended.

The abnormality determination portion 44 of the data processing device 4 determines the response state of the object to the action for requiring the response which the movable body 3 performs based on the environment information from the environment sensor 2 and/or the movable body 3, to determine the abnormality of the object (step S104). For example, the abnormality determination portion 44 determines the abnormality of the object based on the voice of the response state acquired by the microphone 25, 35.

In case the abnormality determination portion 44 cannot determine the abnormality of the object (No of step S105), the instruction portion 43 performs the action instruction for taking the response state of the object directly by the camera 34 of the movable body 3 and making sure it to the movable body 3 as a second confirmation step (step S106). Meanwhile, in case the abnormality determination portion 44 can determine the abnormality of the object (Yes of step S105), the process is transited to the after-mentioned (step S111).

As the action instruction for taking the response state of the object directly by the camera, for example, in case there is an obstacle between the camera 34 of the movable body 3 and the object, the instruction portion 43 performs the action instruction for removing the obstacle by using the hold manipulation device 33 to the movable body 3. In case there is the object estimated as the abnormality by the abnormality estimation portion 41 in a toilet or a bathroom where it is difficult to install a camera, the instruction portion 43 performs the action instruction for opening a door of the toilet or the bathroom by using the hold manipulation device 33 to the movable body 3. The instruction portion 43 performs the action instruction for moving a chair, a table, a futon, and the like between the camera 34 and the object to the movable body 3. The instruction portion 43 performs the action instruction for changing the posture of the movable body 3 (a posture of stooping, a posture of looking into something, and the like) and taking the object directly by the camera 34 to the movable body 3. After the movable body 3 performs the above-mentioned action (removing the obstacle, and the like), the abnormality determination portion 44 determines the abnormality of the object based on the environment information from the environment sensor 2 and/or the movable body 3 (step S107), and determines whether it is possible to determine the abnormality (step S108).

In case the abnormality determination portion 44 determines it is possible to determine the abnormality (Yes of step S108), the process is transited to the after-mentioned (step S111). Meanwhile, in case the abnormality determination portion 44 determines it is impossible to determine the abnormality (No of step S108), the instruction portion 43 performs the action instruction for requiring the response of the object the movable body 3 again (step S109).

The abnormality determination portion 44 finally determines the abnormality of the object based on the image of the response state of the object directly taken by the camera 34 of the movable body 3 (step S110).

The abnormality determination portion 44 determines whether the determination results in the abnormality of the object or not (step S111). In case of determining the determination results in the abnormality of the object (Yes of step S111), the abnormality determination portion 44 outputs the abnormality signal to the abnormality reporting device 5. The abnormality reporting device 5 reports the abnormality to the administrator in response to the abnormality signal from the abnormality determination portion 44 (step S112). Meanwhile, in case the abnormality determination portion 44 determines the determination dose not result in the abnormality of the object (No of step S111), the process is ended.

As above-mentioned, in the state determination system 1 according to the present embodiment, in case of estimating the abnormality of the object, the action instruction for moving to a neighborhood of the object and requiring the response to the movable body 3 is performed. The abnormality of the object is determined based on the environment information of the response state by acquired by at least one of the environment sensor 2 and the movable body 3. Accordingly, the movable body 3 moves to the neighborhood of the object, requires the response, and makes sure the response state, thereby it becomes possible to accurately grasp the abnormal state of the object in the area where it is impossible to make sure the object adequately.

Note that the present invention is not limited to the above exemplary embodiments and can be modified in various manners without departing from the scope of the present invention.

In the above exemplary embodiment, the instruction portion 43 is included in the data processing device 4, however the instruction portion 43 may be included in the movable body 3. At least one of the abnormality determination portion 41, the storage portion 42, the instruction portion 43, and the abnormality determination portion 44 may be included in the movable body 3. Furthermore, the data processing device 4 may be included in the movable body 3.

In the above exemplary embodiment, in case of determining the position of the object estimated as the abnormality by the abnormality estimation portion 41 is within a predetermined area (private areas such as a toilet, a bathroom, and the like) which is set in advance, the instruction portion 43 may perform the action instruction for moving to a neighborhood of the object and requiring the response to the movable body 3. Note that the above-mentioned position information of the predetermined area is, for example set in the memory 4b in advance. The position information of the predetermined area can arbitrarily be set and changed by the administrator and the like. Therefore, for example, the abnormality of the object in the predetermined area where it is difficult to install the camera can be adequately determined ensuring the privacy of the object without using the image information of the camera.

In the above exemplary embodiment, the instruction portion 43 performs, as the second confirmation step, the action instruction for taking the response state of the object directly by the camera 34 of the movable body 3 and making sure it to the movable body 3. The second confirmation step is not limited to this. The instruction portion 43 may perform the action instruction for acquiring the response state of the object directly by the camera 34 and/or the microphone 35 of the movable body 3 and making sure it to the movable body 3. For example, in case there is an obstacle between the movable body 3 and the object, the instruction portion 43 performs the action instruction for removing the obstacle by using the hold manipulation device 33 to the movable body 3.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A state determination system comprising:
a first detector that is provided in at least one of a predetermined environment and an object in the predetermined environment, and acquires an environment information of the object;
a movable body that moves autonomously and includes a second detector that acquires a circumferential environment information around the movable body, the circumferential environment information including at least one of an image or a voice; and a processor that
sends an action instruction to the movable body, estimates an abnormality of the object based on at least one of the environment information acquired by the first detector and the circumferential environment information acquired by the movable body, and
determines a position of the object estimated as the abnormality, wherein in a case where the processor estimates (a) that the abnormality of the object exists based on at least one of the environment information acquired by the first detector and the circumferential environment information acquired by the movable body and (b) that the position of the object is in a predetermined private area where an obstacle is between the moveable body and the object to block the object, the predetermined private area being a bathroom, a toilet, a bedroom, or a kitchen,
(i) the processor sends the action instruction to the movable body for the movable body to move to a neighborhood of the position of the object, to take an action that elicits a response from the object, and to require a response from the object,
(ii) the moveable body opens a door between the moveable body and the object in response to the action instruction,
(iii) at least one of the first detector and the movable body directly acquires at least one of an image or a voice of a response state of the object in response to the action of the movable body instructed by the processor that elicits the response from the object, and
(iv) the processor determines the abnormality of the object based on the directly acquired image or voice of the response state of the object, and
when the processor determines that the object being estimated to be
abnormal is at a position within a predetermined area which is set in advance, the action Instruction includes an instruction for the movable body to move to the position.

2. The state determination system according to claim 1, wherein the processor estimates the abnormality of the object also based on an action pattern information of the object.

3. The state determination system according to claim 1, further comprising a reporting device that reports in case the processor determines that the object is abnormal.

4. A state determination method for a state determination system which comprises: a first detector that is provided in at least one of a predetermined environment and an object in the predetermined environment, and acquires an environment information of the object; a movable body that moves autonomously and includes a second detector that acquires a circumferential environment information around the movable body, the circumferential environment information including at least one of an image or a voice, the method comprising:
estimating an abnormality of the object based on at least one of the environment information acquired by the first detector and the circumferential environment information acquired by the movable body;
determining a position of the object;
sending an action instruction to the movable body for the movable body to move to a neighborhood of the position of the object, to take an action that elicits a response from the object, and to require a response from the object, when it is estimated that the abnormality of the object exists in a predetermined private area where an obstacle is between the moveable body and the object to block the object, the predetermined private area being a bathroom, a toilet, a bedroom, or a kitchen;
at least one of the first detector and the movable body acquiring directly at least one of an image or a voice of a response state of the object in response to the instructed action of the movable body that elicits the response from the object; and
determining the abnormality of the object based on the directly acquired image or voice of the response state of the object,
wherein sending an action instruction includes instructing the moveable body to opens a door between the movable body and the object, and
when the processor determines that the object being estimated to be abnormal is at a position within a predetermined area which is set in advance, the action instruction includes an instruction for the movable body to move to the position.

5. A movable robot comprising:
a first sensor that acquires a circumferential environment information around the movable robot, the circumferential environment information including at least one of an image or a voice, and
a processor that estimates an abnormality of an object in a predetermined environment based on at least one of an environment information of the object acquired by a second sensor provided in at least one of the predetermined environment and the object, and the circumferential environment information acquired by the first sensor,
wherein in a case where the processor estimates that the abnormality of the object exists in a predetermined private area where an obstacle is between the moveable robot and the object to block the object, the predetermined private area being a bathroom, a toilet, a bedroom, or a kitchen,
(i) the processor sends an action instruction for the movable robot to perform an action of moving to a neighborhood of the position of the object, of taking an action that elicits a response from the object, and requiring a response from the object, (ii) the moveable robot opens a door between the moveable body and the object in response to the action instructions, (iii) at least one of the first sensor and second sensor directly acquires at least one of an image or a voice of a response state of the object in response to the action of the movable robot that elicits the response from the object, and (iv) the processor determines the abnormality of the object based on the image or voice of the response state of the object directly acquired by at least one of the first sensor and second sensor, and when the processor determines that the object being estimated to be abnormal is at a position within a predetermined area which is set in advance, the action Instruction includes an instruction for the movable body to move to the position.

6. A state determination system comprising:

an information acquiring portion that is provided in at least one of a predetermined environment and an object in the predetermined environment, and acquires an environment information of the object;

a movable body that moves autonomously and includes a circumferential environment information acquiring portion that acquires a circumferential environment information around the movable body, the circumferential environment information including at least one of an image or a voice;

an instruction portion that sends an action instruction to the movable body; and an estimation portion that estimates an abnormality of the object based on at least one of the environment information acquired by the information acquiring portion and the circumferential environment information acquired by the movable body, wherein in a case where the estimation portion estimates that the abnormality of the object exists in a private area where an obstacle is between the moveable robot and the object to block the object, the predetermined private area being a bathroom, a toilet, a bedroom, or a kitchen, (i) the instruction portion sends the action instruction to the movable body for the movable body to move to a neighborhood of the position of the object, take an action that elicits a response from the object, and require a response from the object, (ii) the moveable body opens a door between the moveable body and the object in response to the action instructions;

(iii) at least one of the information acquiring portion and the movable body directly acquires at least one of an image or a voice of a response state of the object in response to the action of the movable body instructed by the instruction portion that elicits the response from the object, and (iv) a determination portion determines the abnormality of the object based on the directly acquired image or voice of the response state, and when the processor determines that the object being estimated to be abnormal is at a position within a predetermined area which is set in advance, the action instruction includes an instruction for the movable body to move to the position.

* * * * *